United States Patent [19]

Zeh et al.

[11] 4,114,182

[45] Sep. 12, 1978

[54] CASSETTE TURNING MECHANISM

[75] Inventors: Werner Zeh; Dieter Kühnlein, both of Nuremberg, Germany

[73] Assignee: Grundig E.M.V., Fuerth, Bay, Germany

[21] Appl. No.: 802,714

[22] Filed: Jun. 2, 1977

[30] Foreign Application Priority Data

Nov. 11, 1976 [DE] Fed. Rep. of Germany ....... 2651489

[51] Int. Cl.² .............................................. G11B 5/00
[52] U.S. Cl. ................................................... 360/92
[58] Field of Search ...................... 360/92, 93, 71, 137

[56] References Cited

U.S. PATENT DOCUMENTS

| 3,722,892 | 3/1973 | Haake | 360/92 |
|---|---|---|---|
| 3,833,224 | 9/1974 | Haake | 360/92 |
| 3,836,154 | 9/1974 | Ishikawa | 360/92 |

*Primary Examiner*—John H. Wolff

*Attorney, Agent, or Firm*—Kane, Dalsimer, Kane, Sullivan & Kurucz

[57] ABSTRACT

A turning mechanism for a tape recorder adapted for reversing a cassette to permit the recording and playing of both tape tracks of a tape cassette. The mechanism includes receptacle means adapted to be positioned in the cassette nest of the recorder containing the tape drive and tape recording elements. The receptacle is adapted to automatically shift the cassette into and out of the cassette nest and to reverse the cassette. Activation structure is provided for accomplishing the shifting of the receptacle to reverse the cassette. The receptacle is mounted on the end of the shaft for symmetrical turning about the axis of the shaft. The shaft is turnably supported on a swing-axle for rotation about the axis of the swing-axle. Control gears are provided for rotating the shaft and the swing-axle respectively depending upon the position of the receptacle in relation to the remainder of the mechanism.

1 Claim, 3 Drawing Figures

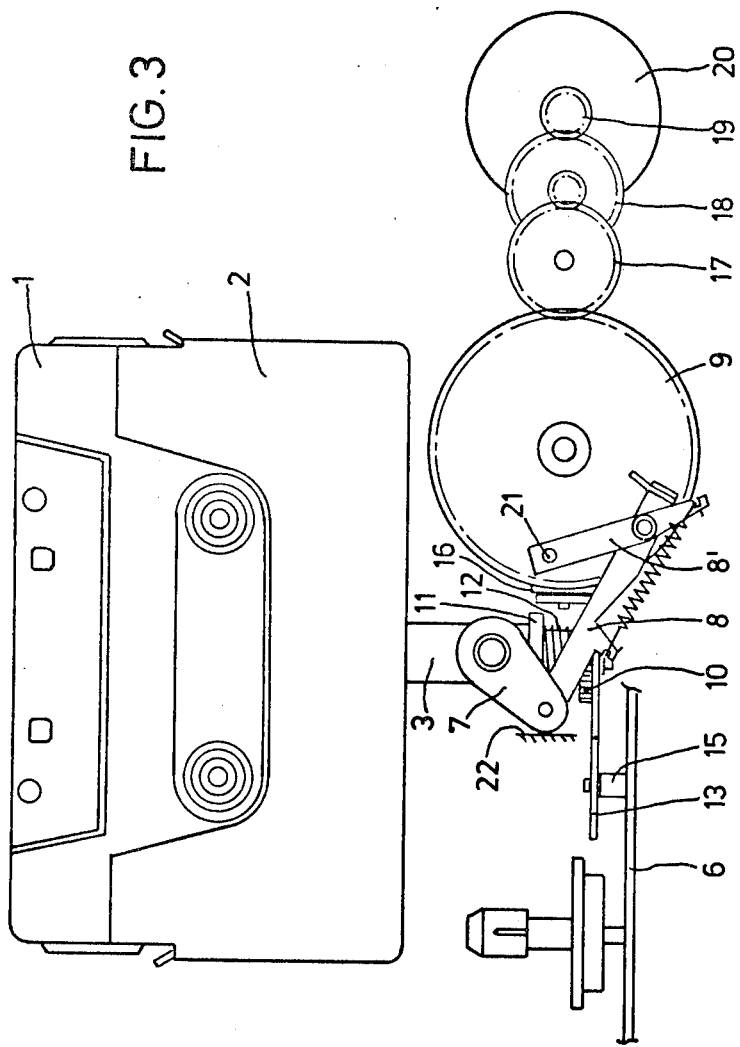

CASSETTE TURNING MECHANISM

BACKGROUND OF THE INVENTION

The present invention concerns a tape-cassette turning mechanism for a tape recorder. The mechanism is operated with a tape-cassette for recording and replaying of both tape tracks. The cassette is inserted into a receptacle mounted on the tape recorder and, at the end of one tape track, automatically or by pushing a manual button on the recorder, the receptacle moves the cassette out of position in a receiving nest in the recorder for recording or playing, reverses the tape and returns the cassette into position in the receiving nest in the recorder for recording or playing of the second tape track. The receiving nest contains the necessary tape drive and tape reading elements.

In the known art there are tape-cassette exchangers which are equipped for the replaying of a number of tapes in a series. The exchangers take each played tape cassette from the recorder and again deposits it on a stock pile. Another known type of mechanism transports a cassette and turns it upside down when it is moved from below a stock pile to above a stock pile so that after playing of one tape-track of all the piled cassettes, the second tape track can be played. Another example of a known type of cassette turning mechanism consists of a cassette rail which is made as a slide-way. The cassettes laying on the slide-way are pushed sideways in relation to the recording head by an amount equal to the width of one cassette each time a finished cassette is pushed out of the recorder. The cassettes transported in this manner are simultaneously turned upside down if the rail extends in a semi-circular loop from the point of exit from the recorder back to the receiving nest. In that type of system, a mechanism is required which lifts the cassettes from the receiving nest and pushes them sideways along the rail. Another type of known cassette changer employs a stock or drum magazine which stores and accomodates the cassettes. It is possible to play the second tape track by turning the entire magazine upside down.

It is apparent that the above discussed presently available systems are not suitable for automatically turning the cassette to play both tracks of the tape in immediate sequence.

SUMMARY OF THE INVENTION

The present invention is designed to create a simple and reliable mechanism which can be used with a commercially available tape cassette of the type where both tracks of the tape can be played or recorded successively and automatically. The mechanism is designed as a simple and uncomplicated structure to be attached to a well known type of recorder to provide a drive for reversing tape cassettes for recording or playing both tape tracks.

A tape recorder able to accomplish the above is provided by incorporating the mechanism of the invention therein. This is accomplished by mounting a receptacle for the cassette for symetrical rotation or turning on the end a shaft about the axis of the shaft. The shaft is turnably supported on a frame mounted swing-axle and extends perpendicular to the axis of the swing-axle for rotation about the axis of the swing-axle. Depending on the position of the shaft in rotation about the swing-axle, the swing motion of the receptacle about the axis of the shaft can also be driven by a control gear from a control motor.

In an advantageous embodiment of the mechanism, the drive gear train includes a control wheel which is driven through idler gears by the control motor. The control wheel is adapted to turn the shaft as well as the swing-axle of the mechanism with desired timing to reverse the cassette.

DETAILED DESCRIPTION OF THE DRAWINGS

In The Drawings:

FIG. 3 is a side elevation view thereof similar to FIG. 2 with the receptacle containing an inserted cassette having been turned about the axis of the shaft half way to the reversed position.

DETAILED DESCRIPTION

Figure 1:
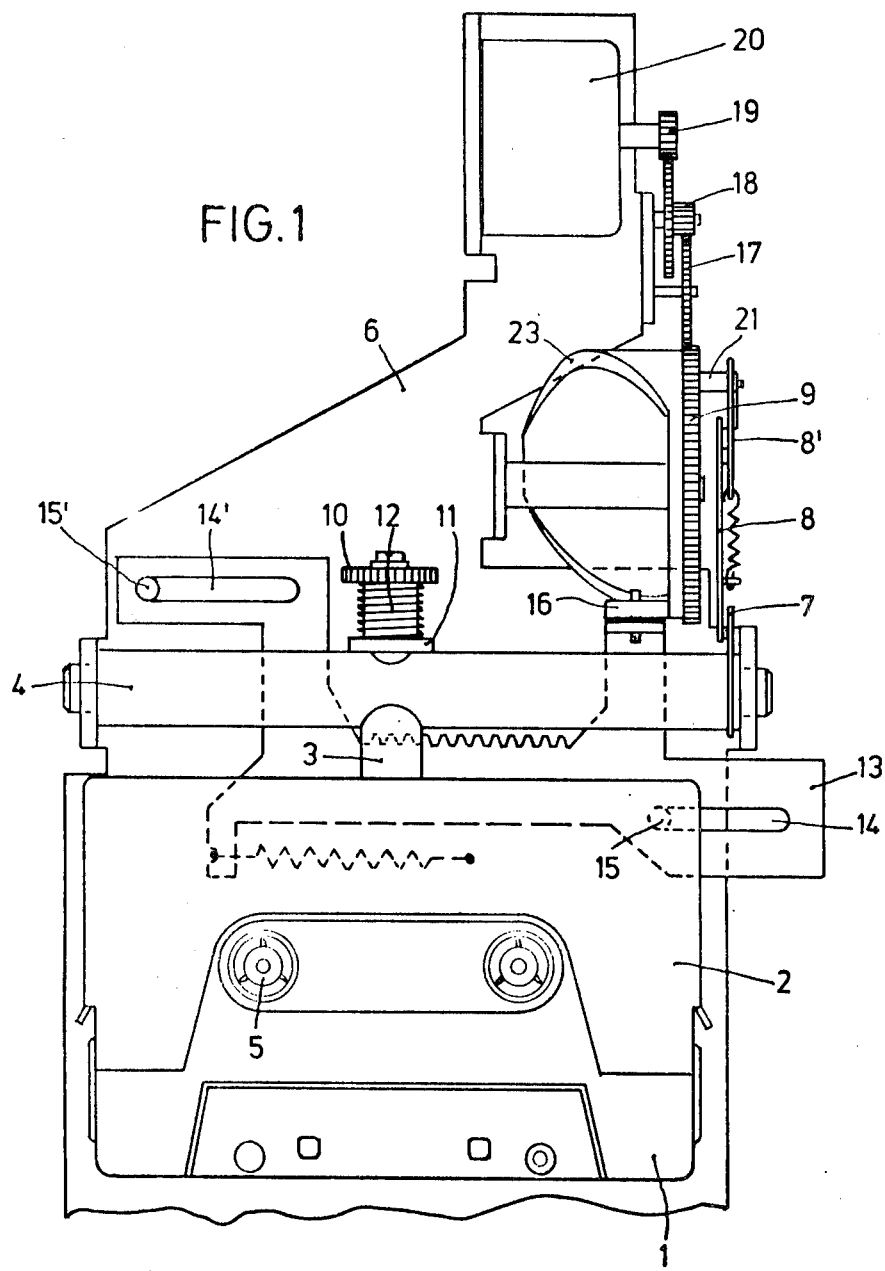
FIG. 1 is a top plan view of the cassette turning mechanism of the invention showing a tape cassette in operating position.

In FIG. 1 the cassette turning mechanism is shown in the operating position in which the tape recorder can be switched on for recording or for playing. Cassette 1 is located in receptacle 2 which is mounted on one end of a shaft 3 for symetrical turning about the axis of the shaft. The shaft 3 is mounted on a swing-axle 4 of the mechanism for rotation or turning about the axis of the swing-axle. The shaft extends substantially perpendicular to the axis of the swing-axle. The known components of the tape recorder including the tape drive and tape reading elements are not shown with the exception of the coil driver 5 shown in FIG. 1 extending into the cassette 1. The cassette which is located in receptacle 2 is inserted into a conventional cassette receiving nest (not shown) of a recorder. A turnable shaft 3 is attached on the bottom side of receptacle 2 opposite from the opening for the cassette. The attachment is made so that, after turning the receptacle for 180° about the axis of the shaft, the inserted and also turned cassette occupies the same position with respect to the drive and reading elements which are fixed on the tape recorder so that the second tape track is in position to be utilized.

In order to make the 180° turn, it is first necessary to swing receptacle 2 with the cassette out of the cassette nest. For this purpose, shaft 3 is fixed to and carried by a swing-axle 4. The swing-axle is supported in two bearings on frame 6 of the mechanism for rotation about its axis to swing perpendicuarlly extending shaft 3 and attached receptacle out of and into the cassette nest. A lever arm 7 is rigidly attached to the swing-axle 4 close to the bearing at one end. Lever arm 7 is connected to a control wheel 9 by a pair of links 8 and 8' in the manner of a crank drive. The links act together as a connecting rod. Shaft 3 can rotate in its bearing in the connection with swing-axle 4 and extends through the swing-axle to terminate in a free end on the side of the swing-axle opposite to the receptacle side. A spur gear 10 is mounted on the free end of shaft 3. The distance between receptacle 2 and swing-axle 4 is about equal to the distance between spur gear 10 and the swing-axle 4. A compression spring 12 is located between spur gear 10 and swing-axle 4. The spring 12 presses a disc 11 against the swing-axle 4. Disc 11 serves as a friction clutch to preserve the location of receptacle 2 in relation to swing-axle 4 during the swing motion.

Spur gear 10 is engaged with rack 13 by turning swing-axle 4 and swinging the gear down and the receptacle up. Rack 13 is guided in two slots 14 and 14' on pins 15 and 15' respectively on frame 6 and can move parallel to the axis of the swing-axle 4. Rack 13 is spring biased in a direction which presses a roller 16 attached to the rack against a face cam 23. The face cam is mounted on control wheel 9. Control wheel 9 is connected to the pinion 19 of a control motor 20 by gears 17 and 18.

Figure 2:
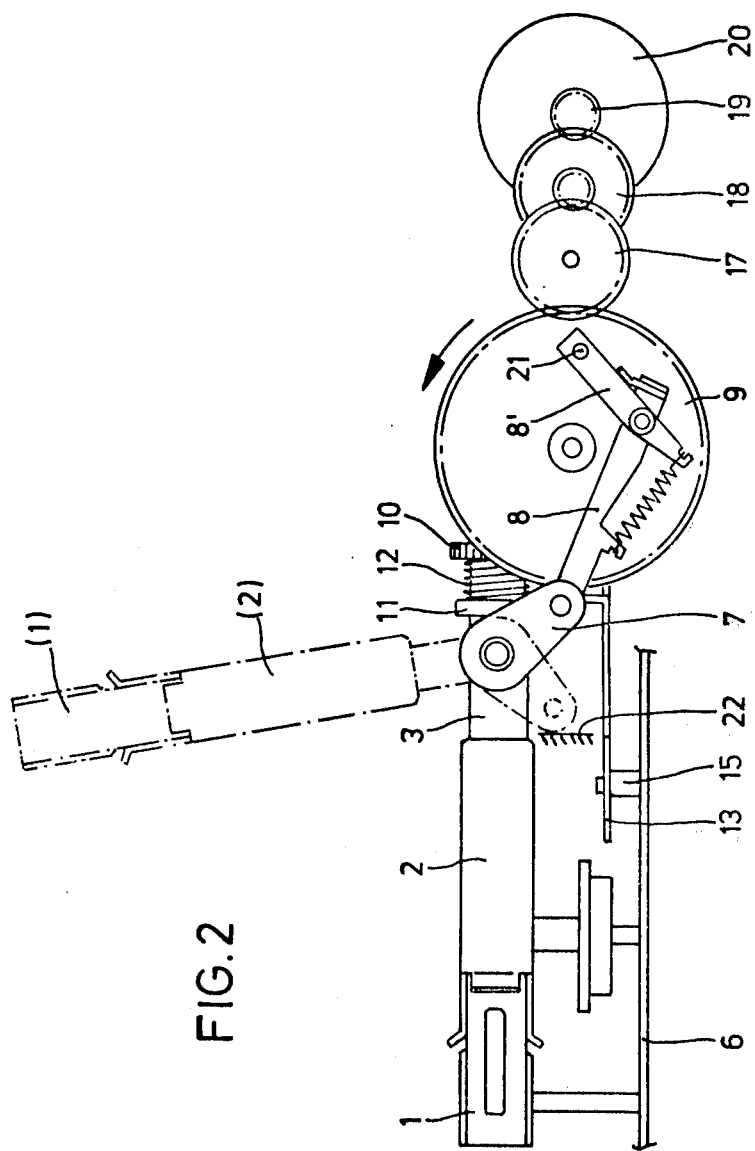
FIG. 2 is a side elevation view thereof showing in phantom the receptacle with an inserted cassette rotated about the swing-axle to a position out of the operating position.

FIG. 2 depicts the manner in which the parts of the cassette turning mechanism work together. FIG. 2 is a side elevation view of FIG. 1. If a pulse is initiated either automatically or manually, control motor 20 is activated by suitable connections with related electrical circuitry by conventional switches. Once initiated by the pulse, control motor 20 drives control wheel 9 by means of its pinion 19 and gears 17 and 18 in the direction indicated by the arrow in FIG. 2. Further on the pair of links 8 and 8' connected to control wheel 9 by pivot bearing 21 drives crank arm 7. The crank arm is rigidly connected to swing-axle 4 for rotation approximately 90° into a position indicated by phantom lines in FIG. 2 to press against a stop 22 on frame 6. In this manner, receptacle 2 together with inserted cassette 1 at the end of shaft 3 attached to swing-axle 4 is swung up about the axis of swing-axle 4 approximately 90° into the position shown in phantom lines in FIG. 2. During further rotation of control wheel 9, crank arm 7 remains stationary against stop 22 on frame 6. This is possible due to the predetermined linkage design of the spring loaded pair of links 8 and 8'.

FIG. 3 shows how gear 10 on shaft 3 is engaged with rack 13. As control wheel 9 keeps turning with crank arm 7 against stop 22, face cam 23 mounted on control wheel 9 pushes roller 16 of rack 13 and moves the rack 13 against the force of a tension spring (not numbered). The engaged spur gear 10 turns shaft 3 and receptacle 2 for 180° about the axis of shaft 3. After turning of the receptacle 2 and cassette 1, swing axle 4 together with shaft 3 and receptacle 2 are swung back to the starting position rotating about the axis of swing-axle 4. This brings the parts once again to the position depicted in FIG. 1. Crank arm 7 and the pair of links 8 and 8' accomplish the swinging action. In this manner, cassette 1 is brought back into the cassette nest in reversed or turned condition and is ready for recording or playing of the second tape track. In a conventional manner, the electric circuitry for control motor 20 is interrupted after finishing of the turning or rotating operation.

As a refinement or alternative control in the system it is possible to control the cassette turning mechanism so that, for insertion or extraction of the cassette, the receptacle can be swung partially up and, after insertion or extraction of the cassette, can be swung back into the cassette nest without turning the cassette. Furthermore, a switching and wiring arrangement is possible so that the cassette can be turned each time the end of a tape track has been reached in a continuous manner until the cycle is manually interrupted. Additionally, a simple loading mechanism can be provided for removing a cassette played on both tape tracks from the receptacle and replacing it with a new one taken from a stock of cassettes.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. A cassette turning mechanism operable with a tape-cassette utilized for recording and replaying of two opposing tape tracks, the cassette being insertable into a receptacle mounted on a tape recorder, and, at the end of one tape track, either automatic or manual means on the recorder, the receptacle moves the cassette out of a first position in a receiving nest in the recorder which contains the necessary tape drive and tape recording elements, the improvement comprising; a shaft centrally mounted along the edge of the receptacle opposite to the cassette receiving edge and extending substantially perpendicular therefrom, a swing axle with the shaft rotatably mounted thereon, the swing axle running parallel with respect to said opposite receptacle edge, the swing axle being rotatable around its longitudinal axis, a control drive means for rotating the swing axle around its longitudinal axis and pivoting the receptacle and cassette from the first position within the tape recorder to an extended second position, a spur gear mounted on said shaft and engaging said control drive means after the pivot movement of the receptacle to the second position so that the control drive rotates the shaft together with the receptacle by 180°; after which the receptacle is adapted to be returned to the first position and the other tape track can be transduced, the control drive including a control motor, intermediate wheels and a control wheel interconnected so that the control motor drives the control wheel by use of the intermediate wheels, a crank arm is mounted on the swing axle, a pair of links in form of a crank drive coupling the control wheel and the crank arm, the control wheel has a flat side, a face cam mounted on the side of the control wheel, and a rack including a cam follower means engaged by the face cam and being under spring tention.

* * * * *